2,805,129

MANUFACTURE OF HYDRAZINE

John F. Haller and Theodore H. Dexter, Niagara Falls, N. Y., assignors to Olin Mathieson Chemical Corporation, a corporation of Virginia No Drawing. Application August 21, 1951,
Serial No. 242,979

1 Claim. (Cl. 23—190)

Our invention relates to the manufacture of anhydrous hydrazine by direct reaction of chlorine and ammonia. Present commercial manufacture of hydrazine depends upon application of the Raschig process which requires reaction of caustic soda and chlorine to sodium hypochlorite, oxidation of the ammonia by the hypochlorite to chloramine and reduction of the chloramine with excess ammonia to hydrazine. The product is produced in highly diluted form, e. g. about 1 to 1.5 percent, in aqueous admixture. Expensive concentrating and separating steps to remove excess ammonia, salt and water are required to recover a product containing about 85 percent hydrazine hydrate. The 85 percent hydrate must be chemically treated in further expensive dehydrating steps as by acid absorption and ammonolysis of the resulting salts to produce hydrazine in suitable commercial anhydrous form. Obviously, direct reaction of chlorine and ammonia to produce hydrazine would be an attractive possibility in reducing the cost and complexity of processing, particularly, if the product could be directly recovered in anhydrous form. It is well known, however, that the reduction of chlorine and ammonia is difficult to control and proceeds with great rapidity to form nitrogen trichloride with consequent danger of violent explosion. For this reason, apparently, production of hydrazine by direct reaction of chlorine and ammonia has not been considered a commercial possibility. We have now found, however, that the reaction proceeds smoothly and almost quantitatively when conducted stepwise to produce in a first reaction stage a gas mixture of monochloroamine in excess ammonia which may then be reacted in a second reaction stage with additional ammonia to produce high yields of anhydrous hydrazine. The process has several advantages associated with its stepwise nature. For example, it has the special advantage of being a cleaner process since by-product ammonium chloride produced in the initial reaction of ammonia with chlorine in gas phase can be filtered out of or otherwise separated from the gas stream prior to the formation of anhydrous hydrazine in the second reaction. Thus the reaction to form anhydrous hydrazine in the second reaction stage is uncomplicated by the presence of ammonium chloride, resulting in improved yields and simplified anhydrous hydrazine separation and recovery problems. In addition, the stepwise process provides for independent control of the variables in each reaction stage.

In the practice of our invention, chlorine and ammonia are reacted in gas stream to produce monochloroamine. The reaction temperature is limited to about 100° C. advantageously by employing nitrogen or other inert gas as a diluent for the chlorine. The molar ratio of ammonia to chlorine should be not less than 10:1 and may be up to 50:1 or higher, but advantageously about 20 to 40:1. In controlling the temperature by nitrogen dilution, the nitrogen to chlorine molar ratio should be not below about 5:1. The resulting gaseous admixture is passed through separating means to remove by-product ammonium chloride and sufficient ammonia is added so that the molar ratio of ammonia to monochloroamine is from about 100 to 500 mols of ammonia per mol of monochloroamine. The admixture is then heated in a confined reaction zone to a temperature of from about 25° to 100° C. preferably 40° to 60° C. under a pressure of from about 50 to 500 pounds per square inch. These conditions are maintained for at least one-half hour and up to about 20 hours or more, preferably about 1 to 8 hours, and hydrazine is recovered from the reaction products. For example, the reaction products which comprise hydrazine, ammonia, ammonium chloride and hydrazine hydrochloride may be cooled and condensed and solid caustic added in the proportion of 2 mols per mol of chloride. One mol of caustic serves to liberate the reaction products and form sodium chloride and the second mol combines with the water formed in the neutralization. The anhydrous liquid ammonia solution of hydrazine may then be separated from the insoluble sodium chloride and $NaOH \cdot H_2O$ and anhydrous hydrazine recovered by evaporating ammonia at atmospheric pressure until the liquid is at room temperature.

When chlorine and excess ammonia are admixed in the gaseous state, copious and voluminous amounts of solid ammonium chloride are formed and very high temperatures are produced. Ammonium chloride at these temperatures appears to decompose monochloroamine and thus the yield of the desired produce obtained by direct admixture of the two gases is negligible. Diluting the chlorine with nitrogen or other inert gas prior to its reaction with excess ammonia provides a particularly convenient means for controlling the temperature of the reaction. As stated previously the molar ratio of ammonia to chlorine should not be less than 10:1 and may be up to 50:1 or higher, and the nitrogen to chlorine ratio should not fall below about 5:1. In general, as the ammonia-chlorine ratio increases the yield of monochloroamine increases. For example, yields of monochloroamine as high as 94% of theoretical have been obtained by reaction under controlled conditions of mol ratios of ammonia to chlorine to nitrogen of 78:1:16. However, with increased ammonia to chlorine ratios costs increase and beyond a certain point the concentration of monochloroamine in the resulting gas stream becomes so low that economic operation to form hydrazine is impossible. Also, with lower proportions of ammonia to chlorine the yield decreases, probably due to inferior mixing or protection of chlorine gas from ammonium chloride, protection of monochloroamine from chlorine, etc. The nitrogen-chlorine ratio should not fall below 5:1 and advantageously is maintained between about 8:1 and 15:1 in order satisfactorily to control the reaction temperature and to obtain high yields of monochloroamine. Dilutions of greater than about 25 mols of nitrogen per mol of chlorine, although they further lower the reaction temperature, improve yields only slightly, and appear to serve no useful purpose. Using proportions within the preferred ranges the concentration of chloroamine in the diluent gases usually approximates about 4%.

The following data illustrate yields of monochloroamine based on the chlorine charge which were obtained in a gas stream over a period of two hours while varying the proportions of ammonia, nitrogen, and chlorine introduced to the reaction chamber.

| Molar ratio, $NH_3:N_2:Cl_2$ | Yield of Monochloroamine, percent |
|---|---|
| 30:15:1 | 82.6 |
| 40:15:1 | 82.3 |
| 30:8:1 | 81.4 |
| 30:22:1 | 80.5 |

As stated previously, in the initial reaction to form monochloroamine voluminous amounts of ammonium chloride are produced which must be removed from the reaction chamber and/or from the gaseous admixture leaving that chamber in order for the reaction to proceed at an adequate rate. An additional difficulty is caused by concentration of ammonium chloride around the chlorine gas inlet with resulting clogging of that inlet and termination of the reaction. Apparatus which provides for continuous removal of the ammonium chloride from the reaction chamber and from the gaseous mixture leaving that chamber, and in which the chlorine inlet is so arranged that it is not substantially clogged by ammonium chloride for periods in excess of two hours, is described in the copending application of Theodore H. Dexter, Serial No. 242,856, filed August 21, 1951, now U. S. Patent 2,739,043, issued March 20, 1956. The apparatus there described comprises essentially a mushroom shaped reactor having an enlarged upper reaction chamber and a lower stem of restricted cross-section depending therefrom, means for introducing chlorine diluted with nitrogen into the lower portion of the stem of the mushroom shaped reactor, means situated in the lower section of the upper reaction chamber for introducing one or more ammonia streams in such a manner that the flow is directed across the rim created by the juncture of the reaction chamber and the stem depending therefrom, means for dislodging the ammonium chloride formed inwardly in a ring on the rim so that it falls to the base of the stem, means for removing ammonium chloride collecting in the base of the stem, overhead means from the reaction chamber to, for example, an inverted filter chamber containing a flexible filter element for removing suspended ammonium chloride from the overhead gas stream, means for flexing the filter medium to dislodge the ammonium chloride so that it falls to the bottom of the inverted filter chamber, means for removing ammonium chloride from the bottom of the inverted filter chamber, and means for withdrawing from the inverted filter chamber the gaseous reaction products substantially free of ammonium chloride. Advantageously the means for introducing chlorine diluted with nitrogen comprises an inlet pipe discharging at a downwardly disposed angle in the depending stem. Also advantageously the cross-section of the depending stem should be such that mixing of the diluted chlorine with ammonia does not occur in the stem. However, any device which provides for separation of the ammonium chloride from the gas stream and in which the clorine inlet is arranged to avoid clogging by ammonium chloride may be used.

The ammonium chloride produced as a by-product in the first reaction is unusually pure and commands a premium in the market. If desired it may be treated with lime or in other known ways to recover ammonia, chlorine and/or hydrogen chloride.

The reaction in the second reaction stage between excess ammonia and monochloroamine may be executed in one way by first separating the ammonia and monochloroamine from the filtered gaseous mixture by their liquefaction at atmospheric pressure. A convenient means for refrigeration and condensation of these components is solid carbon dioxide alone or in liquid admixture with acetone, ether, chloroform-carbon tetrachloride mixtures, or the like. Only the inert gas used to dilute the chlorine passes through the condenser and is discarded or recycled for reuse. Alternatively the gaseous admixture of monochloroamine, ammonia and inert gas may be directly compressed in suitable equipment and thus maintained for a sufficient time at the desired temperature to effect the second reaction.

We have found that maximum yields of anhydrous hydrazine are obtained when a mixture of ammonia and monochloroamine in the molar ratio of about 100 to 500 mols of ammonia per mol of monochloroamine is brought to a temperature of about 40° to 60° C. in a confined reaction zone under a pressure of 50 to 500 pounds per square inch and thus maintained for from about 10 to 20 hours. Molar ratios of less than about 100 to 1 usually result in lower yields and ratios of over about 500 to 1 are not only relatively ineffective in further improving the yield but are also economically unfeasible. Although highest yields are obtained at temperatures of about 40° to 60° C., satisfactory yields can be obtained in the range of about 25° to 100° C. Time of reaction may also vary from about 0.5 to 24 hours or more. Shorter times may be insufficient and longer times appear to be of no advantage. The following examples further illustrate the operation of our invention and indicate the effect of various operating conditions on yield without intention however of limiting the operation to the particular procedures described.

*Example I*

Chlorine (0.002 mol per minute) diluted with nitrogen in the proportion of 8 mols of nitrogen per mol of chlorine was admixed with 0.032 mol per minute of ammonia gas in the preferred apparatus described in the copending application of Theodore H. Dexter, Serial No. 242,856, filed August 21, 1951, now U. S. Patent 2,739,043, issued March 20, 1956. After passing upwardly through a glass wool filter to remove the solid ammonium chloride, the gases were cooled in a condenser refrigerated with solid carbon dioxide in a mixture of about 50% $CCl_4$ and 50% $CHCl_3$ and containing originally 2 moles of liquid ammonia. The final mixture contained ammonia and monochloroamine in the molar ratio of about 435 to 1. The liquid mixture in a sealed glass tube was inserted into a cooled iron cylinder, capped tightly, and allowed to warm to room temperature over a period of about 1 hour. The cylinder and contents were then heated for 18 hours at 50° C. and then refrigerated. The contents were allowed to evaporate by warming to room temperature. The residue showed on analysis a yield of 56.0% of hydrazine.

*Example II*

Chlorine (0.002 mol per minute) diluted with nitrogen in the proportion of 8 mols of nitrogen per mol of chlorine was admixed with 0.032 mol per minute of ammonia gas according to the procedure of Example I. After removal of the solid ammonium chloride, the gases were cooled in a refrigerated condenser containing originally 2 mols of liquid ammonia. The final mixture contained ammonia and monochloroamine in the molar ratio of about 173 to 1. The liquid mixture in a sealed glass tube was inserted into a cooled iron cylinder, capped tightly, and allowed to warm to room temperature over a period of about 1 hour. The cylinder and contents were then heated for 15 hours at 50° C. and then refrigerated. The contents were allowed to evaporate by warming to room temperature, and the residue showed on analysis a yield of 40.7% hydrazine.

*Example III*

Chlorine (0.001 mol per minute) diluted with nitrogen in the proportion of 16 mols of nitrogen per mol of chlorine was admixed with 0.032 mol per minute of ammonia gas according to the procedure of Example I. After removal of the solid ammonium chloride, the gases were cooled in a refrigerated condenser containing originally 2 mols of liquid ammonia. The final mixture contained ammonia and monochloroamine in the molar ratio of about 392 to 1. The liquid mixture in a sealed glass tube was inserted into a cooled iron cylinder, capped tightly, and allowed to warm to room temperature over a period of about 1 hour. The cylinder and contents were then heated for 3 hours at 50° C. and then refrigerated. The contents were allowed to evaporate by warming to room temperature, and the residue showed on analysis a yield of 49.8% hydrazine.

*Example IV*

Chlorine (0.001 mol per minute) diluted with nitrogen in the proportion of 16 mols of nitrogen per mol of chlorine was admixed with 0.032 mol per minute of ammonia gas according to the procedure of Example I. After removal of the solid ammonium chloride, the gases were cooled in a refrigerated condenser containing originally 2 mols of liquid ammonia. The final mixture contained ammonia and monochloroamine in the molar ratio of about 480 to 1. The liquid mixture in a sealed glass tube was inserted into a cooled iron cylinder, capped tightly, and allowed to warm to room temperature over a period of about 1 hour. The cylinder and contents were then heated for 8 hours at 25° C. and then refrigerated. The contents were allowed to evaporate by warming to room temperature. The residue showed on analysis a yield of 17.7% of hydrazine.

*Example V*

Chlorine (0.002 mol per minute) diluted with nitrogen in the proportion of 8 mols of nitrogen per mol of chlorine was admixed with 0.032 mol per minute of ammonia gas according to the procedure of Example I. After removal of the solid ammonium chloride, the gases were cooled in a refrigerated condenser containing originally 3 mols of liquid ammonia. The final mixture contained ammonia and monochloroamine in the molar ratio of about 457 to 1. The liquid mixture in a sealed glass tube was inserted into a cooled iron cylinder, capped tightly, and allowed to warm to room temperature over a period of about 1 hour. The cylinder and contents were then heated for 1 hour at 100° C. and then refrigerated. The contents were allowed to evaporate by warming to room temperature, and the residue showed on analysis a yield of 45.8% of hydrazine.

We claim:

A two stage process for the manufacture of anhydrous hydrazine which comprises directly reacting chlorine gas diluted with an inert gas in the molar ratio of about 5 to 25 mols of inert gas per mol of chlorine with ammonia gas in the molar ratio of about 10 to 50 mols of ammonia per mol of chlorine in a first reaction stage to produce monochloroamine, separating solid ammonium chloride from the reaction mixture, cooling the reaction mixture sufficiently to condense ammonia and monochloroamine and separating a liquid ammonia-monochloroamine admixture therefrom, adding to the liquid ammonia-monochloroamine admixture sufficient liquid ammonia such that the molar ratio of ammonia to monochloroamine is from about 100 to 500 mols of ammonia per mol of monochloroamine, heating the resulting admixture in a confined second reaction stage to a temperature of from about 25° to 100° C. under a pressure of from about 50 to 500 p. s. i. g. for a period of at least 0.5 hour, cooling and condensing the reaction products, and recovering hydrazine and ammonia from the second stage reaction mixture.

References Cited in the file of this patent

UNITED STATES PATENTS

| | | |
|---|---|---|
| 2,118,904 | Staudt et al. | May 31, 1938 |

FOREIGN PATENTS

| | | |
|---|---|---|
| 139 | Great Britain | of 1908 |
| 199,750 | Great Britain | June 29, 1923 |